US010062554B2

(12) United States Patent
Conley

(10) Patent No.: US 10,062,554 B2
(45) Date of Patent: Aug. 28, 2018

(54) METAMATERIAL PHOTOCATHODE FOR DETECTION AND IMAGING OF INFRARED RADIATION

(71) Applicant: The United States of America as represented by the Secretary of the Navy, Washington, DC (US)

(72) Inventor: Benjamin R. Conley, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/824,281

(22) Filed: Nov. 28, 2017

(65) Prior Publication Data

US 2018/0151338 A1    May 31, 2018

Related U.S. Application Data

(60) Provisional application No. 62/426,638, filed on Nov. 28, 2016.

(51) Int. Cl.
*G01J 5/02* (2006.01)
*H01J 40/06* (2006.01)
*H04N 5/33* (2006.01)
*H01J 40/16* (2006.01)

(52) U.S. Cl.
CPC ............. *H01J 40/06* (2013.01); *H01J 40/16* (2013.01); *H04N 5/332* (2013.01)

(58) Field of Classification Search
CPC .......................... H01J 31/507; H01J 43/246
See application file for complete search history.

(56) References Cited

U.S. PATENT DOCUMENTS

| | | | | |
|---|---|---|---|---|
| 3,845,496 A * | 10/1974 | Martinelli | ............... | H01J 1/34 257/10 |
| 3,959,045 A * | 5/1976 | Antypas | ............... | H01J 9/12 117/954 |
| 4,073,989 A * | 2/1978 | Wainer | ............... | H01J 1/32 313/105 CM |
| 4,220,975 A * | 9/1980 | Lieber | ............... | H01J 31/502 313/105 CM |
| 4,310,857 A * | 1/1982 | Lieber | ............... | H01J 31/50 348/215.1 |
| 5,285,061 A * | 2/1994 | She | ............... | H01J 31/506 250/214 VT |
| 5,402,034 A * | 3/1995 | Blouch | ............... | H01J 31/507 313/103 CM |
| 5,404,026 A * | 4/1995 | Mariella, Jr. | ............... | H01J 1/34 257/10 |
| 5,689,152 A * | 11/1997 | Boutot | ............... | H01J 43/22 313/103 R |
| 6,448,568 B1 * | 9/2002 | Allen | ............... | B82Y 10/00 250/492.24 |
| 9,704,900 B1 * | 7/2017 | Xia | ............... | H01L 27/14618 |

(Continued)

*Primary Examiner* — Kiho Kim
(74) *Attorney, Agent, or Firm* — Christopher A. Monsey

(57) ABSTRACT

Exemplary metamaterial photocathodes enable detection of light from visible through long wave infrared wavelengths. Metamaterial stacks, comprising gold, silicon, and cesium-oxide, coupled to a semiconductor allow hot electrons to efficiently enter a vacuum. The hot electrons are multiplied in a multichannel plate and directly through another vacuum towards a phosphorus screen.

3 Claims, 4 Drawing Sheets

(56) References Cited

U.S. PATENT DOCUMENTS

| | | | |
|---|---|---|---|
| 2003/0042434 A1* | 3/2003 | Mankos | B82Y 10/00 250/492.24 |
| 2003/0048427 A1* | 3/2003 | Fernandez | B82Y 10/00 355/53 |
| 2011/0133055 A1* | 6/2011 | Andrews | H01J 43/22 250/207 |
| 2011/0234233 A1* | 9/2011 | Brucker | G01L 21/34 324/460 |
| 2014/0239157 A1* | 8/2014 | Burgess | H01J 31/26 250/208.1 |

* cited by examiner

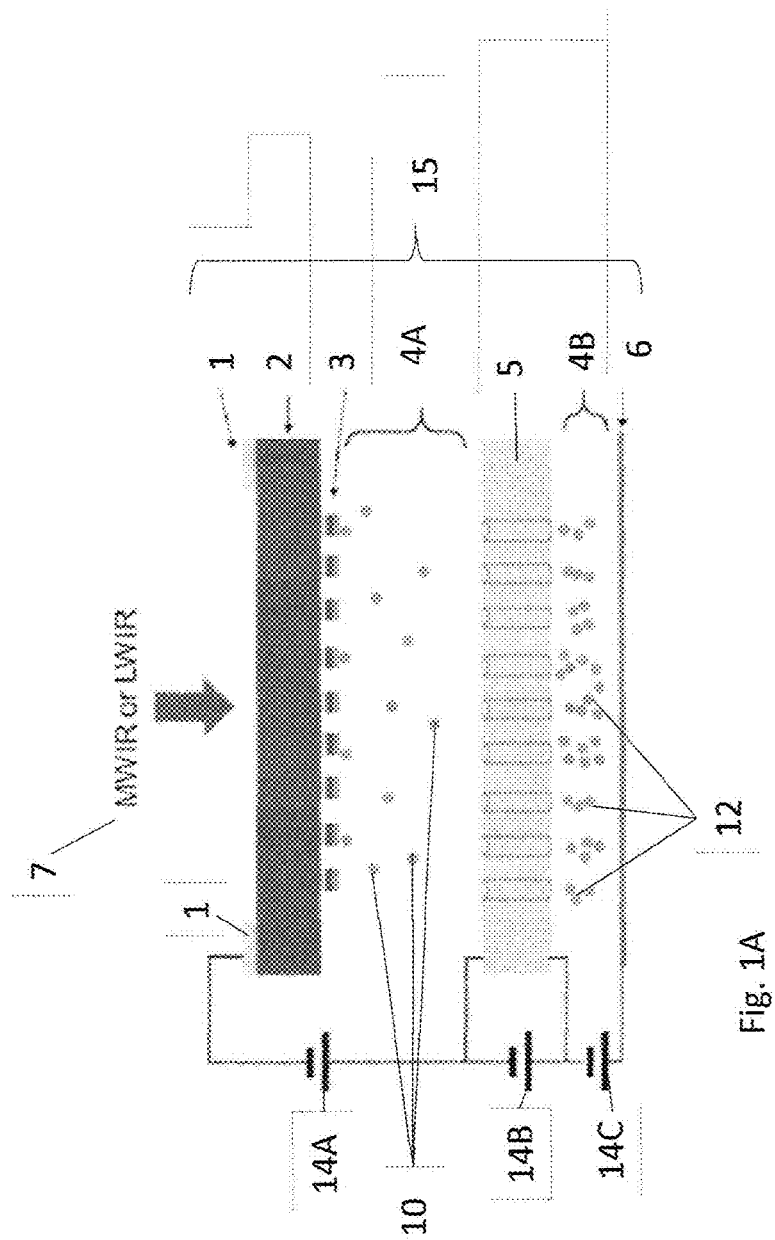

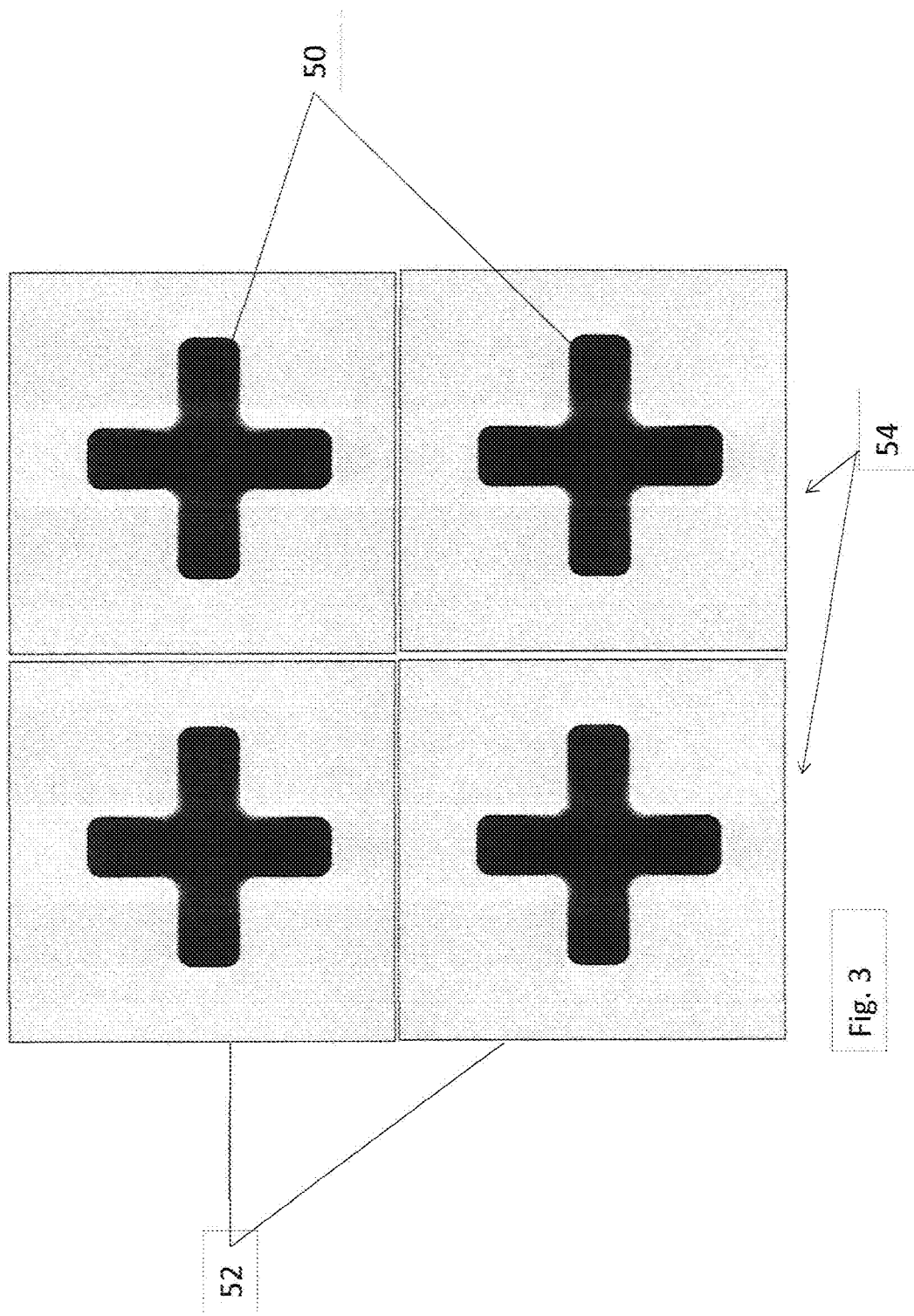

METAMATERIAL PHOTOCATHODE FOR DETECTION AND IMAGING OF INFRARED RADIATION

CROSS-REFERENCE TO RELATED APPLICATIONS

The present application claims priority to U.S. Provisional Patent Application Ser. No. 62/426,638, filed Nov. 28, 2016, entitled "METAMATERIAL PHOTOCATHODE FOR DETECTION AND IMAGING OF INFRARED RADIATION," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,390) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The present disclosure relates to a metamaterial photocathode enabling detection of light from visible through long-wave infrared wavelengths.

BACKGROUND AND SUMMARY OF THE INVENTION

The present invention relates to a metamaterial photocathode (MMP) to enable detection of light from visible through long-wave infrared (LWIR) wavelengths (0.4 to 15 µm).

One of the reasons to develop photocathodes outside of the current spectral band is the prolific distribution of low cost visible cameras. These visible sensors use silicon as the active absorber to convert the incoming light to an electrical signal. Silicon has a bandgap of 1.124 eV at 300 K which corresponds to a cut-off wavelength of 1.10 µm which means these sensors can also detect in the near infrared (NIR). Through device engineering and optical coatings one can tune the response of a Si detector/pixel for different bands. The typical focal plane architecture for these imagers is either a charge coupled device (CCD) or a complementary metal-oxide semiconductor (CMOS) design. The choice of either a CCD or CMOS along with coating and illumination direction (front side vs back side) can have a significant impact on the spectral response of the sensor. The other trade-offs between these two architectures are read out noise, cost, array size, and dynamic range.

The main problem with moving out of band is lack of infrared sensors that can operate at a high refresh rate and still minimize size, weight, and power consumption (SWaP) of the overall payload. The night vision goggle (NVG) meets these criteria for high refresh rate and low SWaP, but it is limited to operation only in the Vis/NIR. The current state-of-the-art in mid-wave infrared (MWIR) imagers is a solid state sensor using InSb or type-II superlattice semiconductor structures as the absorbing elements. Both of these material technologies require cryogenic cooling between 77 and 150 K. This deep cooling requirement is almost an immediate disqualification for handheld use because of the power and size needed for the cold Dewar and pumping components, but some MWIR systems do exist in a handheld form factor at high cost. Current uncooled LWIR imagers operate with an optimal SNR at a maximum of around 30 frames per second. Any further decrease in the response time of the pixel reduces the SNR below a usable limit. Thus current LWIR imagers are also not viable candidates as an out-of-band solution because they are not capable of operating high paced, high frame rate environment. For the short-wave infrared (SWIR), the dominant imaging technology is a solid state sensor with InGaAs pixels. The primary factor in its determination of use is the fact that it has a relatively high sensitivity and can operate at room temperature. Some tradeoffs for consideration for this technology are the large costs associated with these manufacturing FPAs and the power requirements associated with digital imaging arrays when operated at high frame rates.

According to an illustrative embodiment of the present disclosure, a metamaterial photocathode (MMP) to enable detection of light from visible through LWIR wavelengths. A metal-semiconductor-NEA (MSNEA) is used to enhance electron emission. Plasmonic decay creates a hot electron on the surface of the metal. Excess majority carriers (holes) in the p-type semiconductor diffuse into the metal across the Ohmic contact to balance out the charge. Electron-hole pairs (EHP) are thermally created within the semiconductor as holes leave allowing extraction of electrons into the vacuum off the NEA surface. By incorporating a NEA structure into the MMA, the structure would still be impedance matched for high absorption and also be optimized for electron emission from the surface of the metal. Because the core technology behind the absorption mechanism can be scaled to other absorption bands by size and shape, the only upper limit is shorter wavelengths and the ability to fabricate smaller structures.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 1A shows an exemplary diagram of a proposed metamaterial photocathode (MMP) operation with incident MWIR and/or LWIR;

FIG. 3 shows an exemplary lattice of metamaterial absorber (MMA) structures above gold ground plates.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1B:
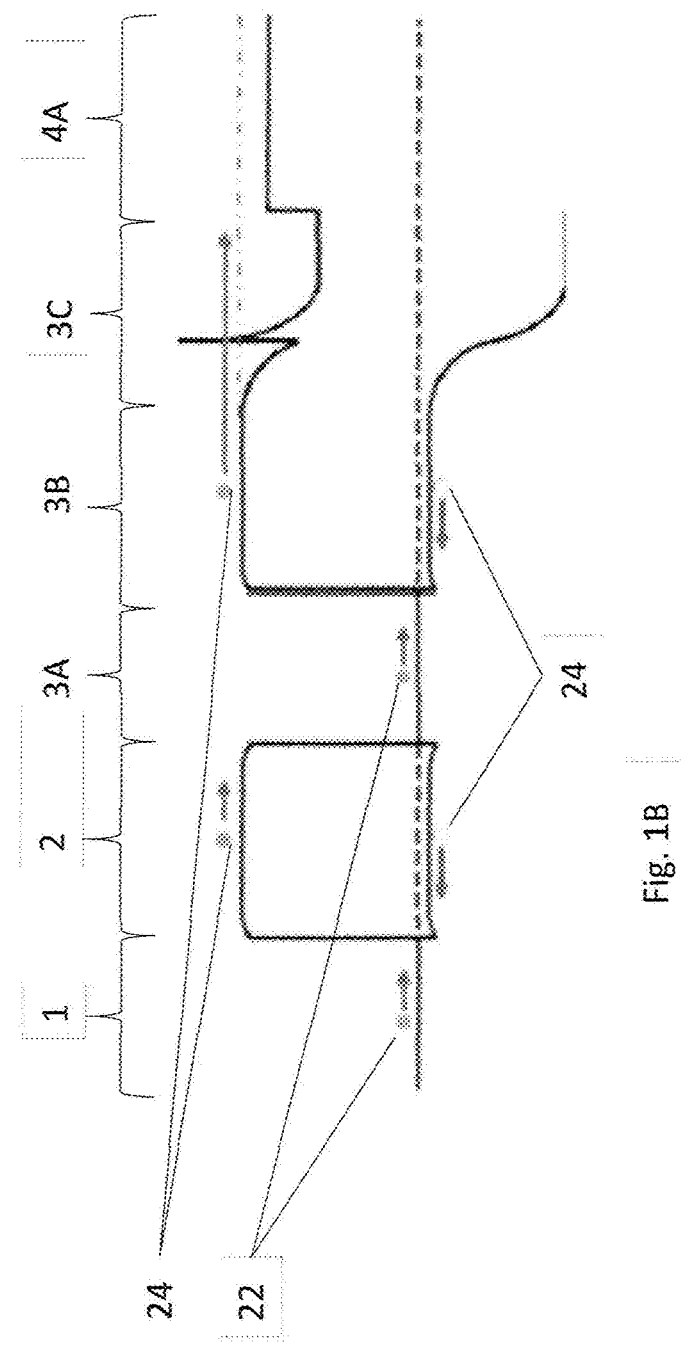
FIG. 1B shows an exemplary band structure of the proposed MMP and the movement of EHPs.

FIG. 1A shows an exemplary diagram of a proposed metamaterial photocathode (MMP) 15 operation with incident mid-wavelength infrared (MWIR) and/or long-wavelength infrared radiation. Incident infrared light 7, which can be either MWIR or LWIR, moves through a first substrate 2 (e.g., a p-type silicon substrate). Contacts 1 (e.g., gold) coupled to first substrate 2 create ohmic contacts which facilitate charge flow. A plurality of metamaterial stacks (MMS) 3 comprising a metallic layer (e.g., gold; see 3A, FIG. 1B), a second substrate (e.g., silicon; see 3B, FIG. 1B), and an NEA layer (e.g., Cs—O; see 3C, FIG. 1B) can be placed on the first substrate 2. Plasmonic decay creates hot electrons on the surface of the metallic layer. Excess majority carriers (i.e., electron holes) in the second substrate diffuse into the metallic layer. EHPs are thermally created within the first substrate 2 and second substrate. An MMS 3 emits a first plurality of electrons 10 into a first vacuum 4A between the MMS 3 which are accelerated towards a microchannel plate (MCP) 5, due to a voltage difference 14A. 14B. Microchannel plate 5 multiplies the first plurality of electrons 10 into a second plurality of electrons 12 via secondary emission and sidewall collisions. The second plurality of electrons 12 travel through a second vacuum 4B until reaching a detector 6 (e.g., a phosphorus screen or anode) for signal readout. Voltage difference 14C draws electrons through the second vacuum 4B. Additionally, a gold contact 1 attached to the p-type Si substrate 2 allows for repopulation of electrons lost during emission by the MMS 3.

FIG. 1B shows a band diagram of a portion of an MMP including a MMS (see FIG. 1A), the p-type Si substrate 2, and the gold contact 1, used by the MMP 15 in FIG. 1A. Hot electrons 24 are generated on a metal surface 3A, causing excess majority carriers (holes) in a p-type semiconductor 3B to diffuse into the metal surface 3A. Within the p-type semiconductor 3B, electron hole pairs are created, which allow for the electrons 22 to be emitted into the first vacuum 4A from a negative electron affinity (NEA) surface 3C.

Figure 2:
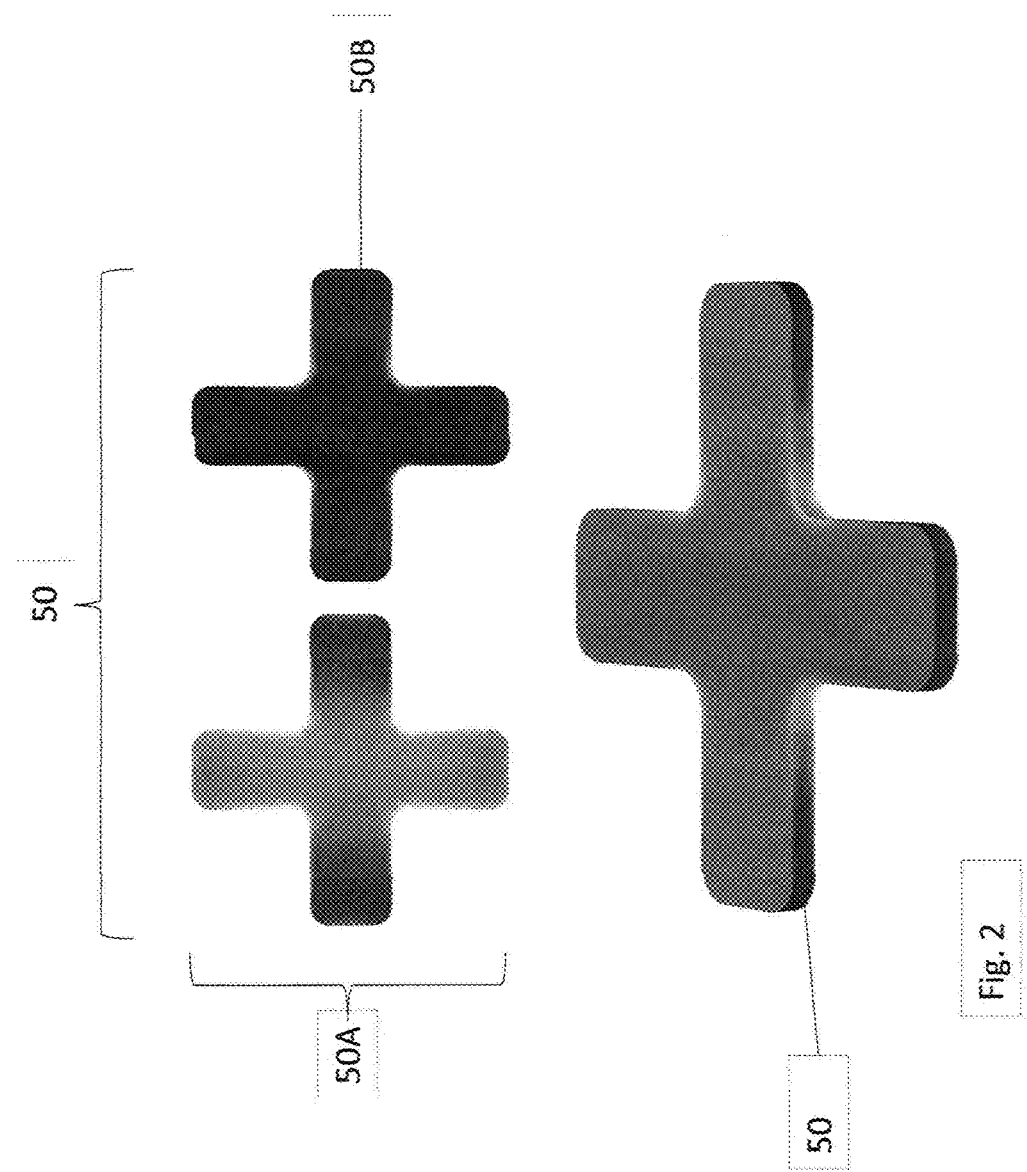
FIG. 2 shows a plurality of views for a proposed metamaterial structure which can be used as part of a metamaterial photocathode.

FIG. 2 shows a plurality of views for a proposed single cross metamaterial absorber (MMA) which can be used as part of the MMS 3 in the MMP 15. In this embodiment, a MMA 50, has a peak absorptance at approximately 6 μm (i.e., within the MWIR range), although in other embodiments, a single cross MMA 50 can be structured to have a peak absorptance at other wavelengths (i.e., LWIR or visible). Single cross MMAs 50, as in this embodiment, can also be tuned to absorb at different wavelengths by altering their geometric properties (e.g., lattice constant, cross length 50A, and cross width 50B).

FIG. 3 shows exemplary lattices 54 of metamaterial absorber 50 structures above gold ground plates 52. Lattices 54 can be placed such that there is no gap between adjacent cells. Lattices 54 can be combined with additional lattice units to create a plurality of lattices with a predetermined overall size. Geometric properties of lattices 54, such as length of each lattice 54, width of the cross of each MMA 50, and length of the cross of each MMA 50, can be altered to alter peak absorptance of light by a MMP. The approximate average peak absorptance for a cross width of 0.5 μm occurs when the ratio between lattice length and cross length was 1.59 (e.g., cross length of 1.3 μm and lattice length of about 2 μm). Adjusting the geometric properties of lattices 54 can increase absorptance at particular target wavelengths to improve visibility in predetermined conditions.

Although the invention has been described in detail with reference to certain preferred embodiments, variations and modifications exist within the spirit and scope of the invention as described and defined in the following claims.

The invention claimed is:

1. A metamaterial photocathode (MMP) comprising:
   a MMP assembly comprising:
      a first and a second metal contact;
      a first substrate comprising a p-type semiconductor, wherein the first substrate has a first side with opposing first and second ends, wherein the first and second metal contacts are coupled to the first and second ends, respectively, wherein the first substrate has a second side opposing the first side;
      a plurality of metamaterial stacks (MMS) each comprising:
         a metamaterial absorber (MMA) layer comprising a metal compound, wherein the MMA layer is coupled to the second side of the first substrate;
         a second substrate layer comprising silicon, wherein the second substrate layer is coupled to the MMA layer; and
         a negative electron affinity (NEA) layer comprising cesium-oxide, wherein the NEA layer is coupled to the second substrate layer;
   a microchannel plate (MCP);
   a phosphorous screen or anode;
   a first vacuum layer between the MCP and the MMP assembly; and
   a second vacuum layer between the MCP and the phosphorous screen or anode;
   wherein an electrical circuit connects the first metal contact, MCP, phosphorus screen or anode, and second metal contact such that applying a current through the circuit creates an electric field across the MMP;
   wherein electron hole pairs (EHP) comprising a first plurality of electrons form within the first and second substrate layers when infrared radiation strikes the MMP assembly, wherein the electric field draws the first plurality of electrons from the first and second substrate layers towards the phosphorus screen or anode and draws a first plurality of electron holes towards the first and second metal contacts;
   wherein the first plurality of electrons interacting with the MCP causes a second plurality of electrons to form within the MCP;
   wherein the first and second pluralities of electrons interact with the phosphorus screen to generate a signal;
   wherein a third plurality of electrons enters the MMP assembly through the first or the second metal contact and fills the first plurality of electrons holes.

2. The MMP of claim 1, wherein the first and second metal contacts comprise gold.

3. The MMP of claim 1, wherein the p-type semiconductor is silicon.

* * * * *